(12) United States Patent
MacLaurin

(10) Patent No.: US 7,861,154 B2
(45) Date of Patent: Dec. 28, 2010

(54) INTEGRATION OF ANNOTATIONS TO DYNAMIC DATA SETS

(75) Inventor: Matthew B MacLaurin, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 11/079,348

(22) Filed: Mar. 14, 2005

(65) Prior Publication Data

US 2006/0206501 A1    Sep. 14, 2006

Related U.S. Application Data

(60) Provisional application No. 60/657,532, filed on Feb. 28, 2005.

(51) Int. Cl.
*G06F 17/30* (2006.01)

(52) U.S. Cl. ............... 715/230; 715/255; 715/231; 707/803

(58) Field of Classification Search .......... 715/512, 715/511, 514, 515, 513, 530, 531, 230, 231, 715/232, 233, 229, 272; 707/3, 102, 101, 707/100, 7, 706, 736, 803; 706/16, 20, 45
See application file for complete search history.

(56) References Cited

U.S. PATENT DOCUMENTS

| | | | | |
|---|---|---|---|---|
| 6,253,217 B1* | 6/2001 | Dourish et al. | ............... | 715/229 |
| 6,266,682 B1* | 7/2001 | LaMarca et al. | ............ | 715/234 |
| 6,519,603 B1* | 2/2003 | Bays et al. | ................. | 707/102 |
| 6,546,405 B2* | 4/2003 | Gupta et al. | ................. | 715/512 |
| 6,549,922 B1* | 4/2003 | Srivastava et al. | ........... | 707/205 |
| 6,732,093 B2* | 5/2004 | Vally et al. | ...................... | 707/4 |
| 6,871,318 B1* | 3/2005 | Wynblatt et al. | ......... | 715/500.1 |
| 7,010,751 B2* | 3/2006 | Shneiderman | .............. | 715/764 |
| 7,013,307 B2* | 3/2006 | Bays et al. | ................... | 707/102 |
| 7,111,237 B2* | 9/2006 | Chan | .......................... | 715/536 |
| 7,418,656 B1* | 8/2008 | Petersen | ..................... | 715/230 |
| 2002/0019837 A1* | 2/2002 | Balnaves | ..................... | 707/512 |
| 2003/0050773 A1* | 3/2003 | Martinez et al. | .............. | 704/10 |
| 2003/0061028 A1* | 3/2003 | Dey et al. | ...................... | 704/9 |
| 2003/0065645 A1* | 4/2003 | Itoh et al. | ....................... | 707/1 |
| 2003/0158897 A1* | 8/2003 | Ben-Natan et al. | .......... | 709/204 |
| 2004/0100510 A1* | 5/2004 | Milic-Frayling et al. | .... | 345/864 |
| 2004/0172593 A1* | 9/2004 | Wong et al. | ................. | 715/512 |
| 2004/0177319 A1* | 9/2004 | Horn | ....................... | 715/501.1 |
| 2004/0205545 A1* | 10/2004 | Bargeron et al. | ............ | 715/512 |
| 2004/0210602 A1* | 10/2004 | Hillis et al. | ............... | 707/104.1 |
| 2005/0027664 A1* | 2/2005 | Johnson et al. | ............... | 706/12 |
| 2005/0033803 A1* | 2/2005 | Vleet et al. | ................. | 709/203 |
| 2005/0216457 A1* | 9/2005 | Walther et al. | ................. | 707/4 |
| 2006/0123332 A1* | 6/2006 | Berg et al. | .................... | 715/512 |
| 2006/0218485 A1* | 9/2006 | Blumenthal | ................. | 715/512 |
| 2007/0136657 A1* | 6/2007 | Blumenthal et al. | ......... | 715/512 |
| 2008/0034283 A1* | 2/2008 | Gragun et al. | .............. | 715/232 |

\* cited by examiner

*Primary Examiner*—Adam L Basehoar

(57) ABSTRACT

A data enhancement system that facilitates attaching annotations to dynamic data items and collections. The system employs the concepts of and item to associate an annotation to a dynamic collection and/or item prior to rendering (e.g., via a graphical user interface) such collection and/or item. A user interface can be provided to facilitate creation and attachment of the annotations (e.g., textual, graphical). A schema can facilitate associating appropriate annotations with a dynamic collection. A display system can be employed to render the annotations to a user.

17 Claims, 9 Drawing Sheets

INTEGRATION OF ANNOTATIONS TO DYNAMIC DATA SETS

CROSS-REFERENCE TO RELATED APPLICATION(S)

This application claims the benefit of U.S. Provisional Patent Application Ser. No. 60/657,532, filed on Feb. 28, 2005, and entitled "INTEGRATION OF ANNOTATIONS TO DYNAMIC DATA SETS," the entirety of which is incorporated herein by reference.

TECHNICAL FIELD

This invention is related to computer systems and more particularly to a system and methodology that enhances comprehensive utilization of data by employing annotations that correspond to dynamic collections associated with a file system.

BACKGROUND OF THE INVENTION

Annotating data is known to be helpful for parsing, comprehending and retaining information via graphical user interfaces. However, annotation systems today are limited in their scope of use. In particular, conventional annotation systems are limited to be used with static documents only. For example, modern computer applications, such as word processing applications, permit users to annotate static documents. In this scenario, annotations can be added to a word processing document in the form of notes such that the notes will appear each time a user views the static document (e.g., word processor file).

In the past, file storage systems had a very simplistic object model consisting of static files and straightforward containers known as "directories" and "folders." Because of their simplicity, annotating these static files was uncomplicated as the criteria related to the file were the same each time it was viewed. Therefore, annotation criteria (e.g., placement) were not variable.

With the technological advances in computing systems and more particularly in the organization of data related to file management systems, there is an ongoing and increasing effort to implement comprehensive container mechanisms to dynamically organize and/or manage data. These new container types include dynamic collections such as query result sets, hyperlinked containers, compound document objects, etc. Moreover, there is an ongoing effort to introduce these new and innovative techniques that dynamically employ association identifiers to reference data into the computer operating system environment. These techniques can increase the comprehensibility and efficiency of operating and storage systems. However, they present an obstacle with regard to annotating data. Because the collections are dynamic associations, conventional methods of annotating static documents are not compatible. Therefore, a substantial need exists for an annotation system and/or methodology that can be employed together with these emerging dynamic containers.

As described supra, existing annotation techniques do not adequately address the ever-changing complexity of these new dynamic container types. Furthermore, a user interface (UI) designed in connection with conventional files and storage systems cannot address this expanding functionality and complexity of the containers. To this end, it would advantageous to have a UI that can employ annotations relating to these emerging dynamic data collections. More particularly, an unmet need exists for a system and/or methodology that permit a user to apply annotations to dynamic data collection items whereby the annotations can be viewed and shared in connection with the dynamic collection view.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

As described supra, conventional computer systems employ an annotation technique that allows annotations to be applied to static items. By contrast, the subject invention introduces a novel annotation technique that can be employed in connection with items referenced within dynamic container types (e.g., list and dynamic list).

A "list" can be a container of mapping identifiers (e.g., associations). Unlike a conventional folder, a single file can be referenced by and accessed via any number of lists. As well, lists can be arranged in an arbitrarily complex graph of relationship. The items (e.g., identifiers) in a list can be chosen arbitrarily by the user or other application (e.g., software program) and need not have any properties in common.

A "dynamic list" can be a collection of data items that is built and maintained automatically by the system for the user. Dynamic lists can be based on queries. In other words, the system can execute a query against a file store whereby identifiers associated to the resulting data items are added to the dynamic list. In accordance with the query operation, if a characteristic of the data component changes, the association to such a data component can be updated, modified or removed from the dynamic list.

The subject invention disclosed and claimed herein, in one aspect thereof, is directed to a novel system that facilitates annotating data in a dynamic collection or container. The subject invention employs the relationship of an annotation to an item in a dynamic collection together with respect to a particular view. In other words, in accordance with the subject invention, an annotation can be a function of an item and specialized view. It will be appreciated that the view can be automatically defined by the system and/or manually defined by a user. In either case, the view facilitates the rendering (e.g., via a graphical user interface (GUI)) of such collection and/or item. A user interface (UI) can be provided to facilitate creation of annotations (e.g., textual, graphical) with respect to dynamic data items.

A schema can facilitate associating appropriate annotations with items in a dynamic collection. More particularly, the schema can define and maintain the relationship between an annotation with respect to a particular view and dynamic data item. It will be understood that the schema can be maintained in a database tuple format. A display system (e.g., GUI) can be employed to render the annotations to a user based upon the schema.

In accordance with aspects of the invention, the UI can facilitate generating and/or applying any type of annotation. For example, in one aspect, a textual comment can be attached to an item based upon a specific view. In other aspects, tinting specific items with background colors, adding a background image to an item, adding a background image to an entire view, arranging items spatially within a view by rotation and/or translation, or the like can be provided to enhance dynamic data items and/or collections. In accordance with alternative aspects, the schema allows the same item to have different annotations with respect to different views. It will be appreciated that this one-to-many relationship can be effected via additional database tuples or records maintained in connection with the schema.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
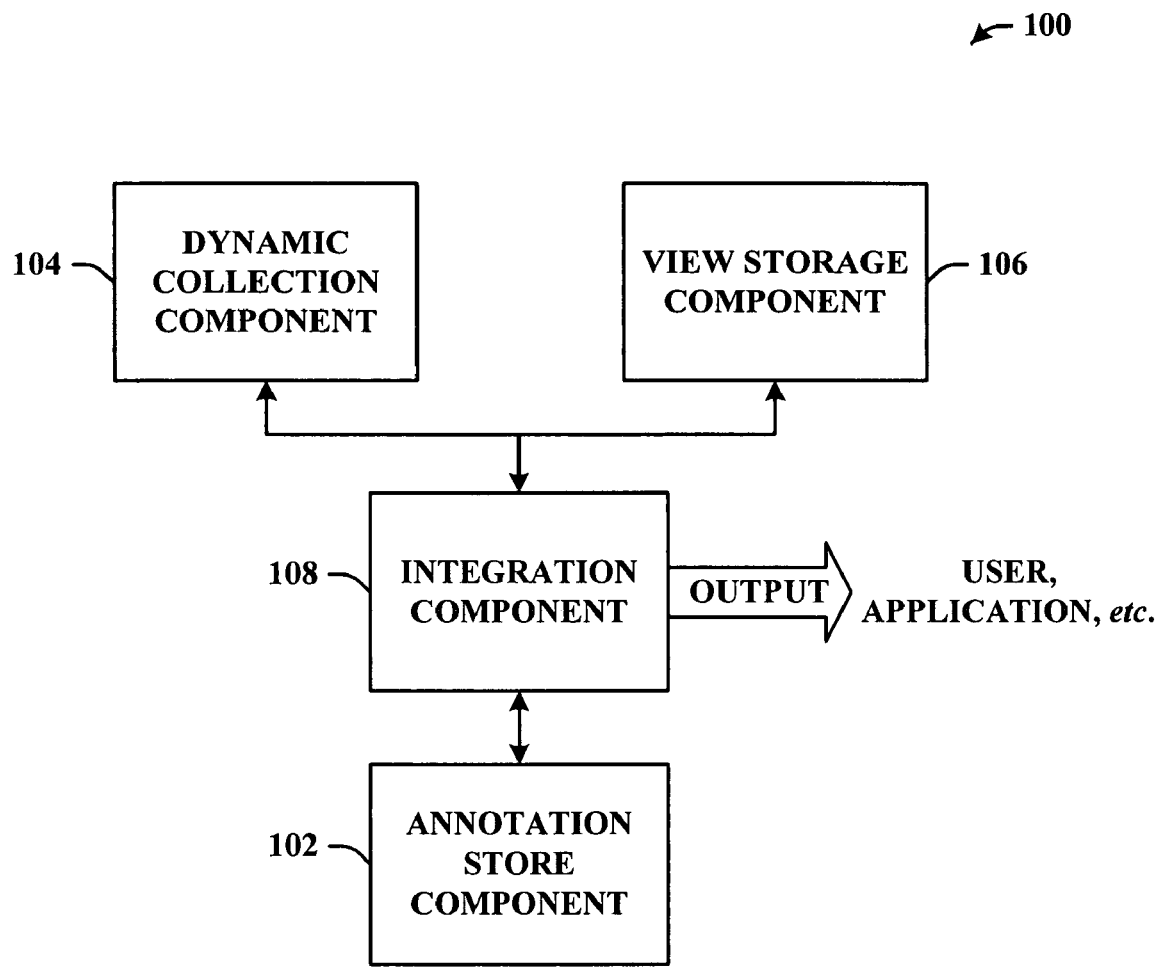
FIG. 1 illustrates a general component block diagram of a system that generates and displays an annotation related to a dynamic data item in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Unlike conventional systems that employ annotation techniques that facilitate annotating static items, the subject invention introduces a novel annotation technique that can be employed in connection with dynamic container types (e.g., list and dynamic list). A "list" can be a container of mapping identifiers (e.g., associations). In contrast to a conventional folder, a single file can be referenced and accessed in any number of lists. As well, lists can be arranged in an arbitrarily complex graph of relationships. The items (e.g., identifiers) in a list can be chosen arbitrarily by the user or other application (e.g., software program) and need not have any properties in common. A "dynamic list" can be a collection of files that is built and maintained automatically by the system for the user. Dynamic lists can be based on queries. In other words, the system can execute a query against a file store whereby identifiers associated to the resulting files are added to the dynamic list. In accordance with the query operation, if a characteristic of the data component changes, the association to such a data component can be updated, modified or removed from the dynamic list. By way of example, if a data component changes whereby it no longer matches the results of the query, the system can dynamically and/or automatically update the list to reflect the changes. Aspects of the subject annotation invention directed to the "list" and "dynamic list" are discussed in detail infra.

Although the specific aspects described herein are directed toward the "list" and "dynamic list" containers, it is to be appreciated that the functionality of the subject invention can be applied to any file management system that employs associations and/or specialized view rendering mechanisms. In addition to the general functionality of the invention with respect to the "list" and "dynamic list", the subject invention, in various aspects thereof, provides for a system and/or methodology that enable combinations of container types. By way of example, a list can contain identifiers corresponding to folders and dynamic lists. Although the subject invention is directed to the association of a list and/or dynamic list to electronic data components, it is to be appreciated that lists and dynamic lists can include associations to any type of data components (e.g., uniform resource locators URLs)), or combination thereof, known in the art.

The subject invention employs the concepts of view and item to associate an annotation to a dynamic collection and/or item prior to rendering (e.g., via a graphical user interface)

such collection and/or item. A user interface (UI) can be provided to facilitate creation of annotations (e.g., textual, graphical, audible) related to data items. A schema can facilitate associating appropriate annotations with a dynamic collection. A display system (e.g., graphical user interface (GUI)) can be employed to render the annotations to a user.

In accordance with aspects of the invention, the UI can facilitate generating and/or applying any type of annotation to a dynamic collection and/or data item. For example, in one aspect, a textual comment can be attached to an item in a specific view. In other aspects, tinting specific items with background colors, adding a background image to an item, adding a background image to an entire view, arranging items spatially within a view by rotation and/or translation, attaching audible sounds or the like can be provided.

As briefly described supra, the subject invention can employ a schema to facilitate storing, relating and rendering the annotation to dynamic data items and/or collections. It will be appreciated that the schema can facilitate associating a single item to disparate annotations based upon a specific view. This relationship between an annotation as a function of the item and view can be better understood with reference to the discussion that follows.

Referring now to FIG. 1, there is illustrated a schematic representation of an aspect of a system 100 that facilitates relating an annotation to a dynamic data item and/or collection in accordance with the subject invention. Generally, the system 100 can include an annotation store component 102, a dynamic collection component 104 and a view storage component 106. An integration component 108 can be employed to interface the annotation store component 102 to the items and/or collections maintained within the dynamic collection component 104. The integration component 106 (e.g., UI) can further employ the view storage component 106 to determine proper rendering of annotations with respect to the dynamic collection component 104.

In operation, the integration component 108 can analyze a dynamic collection (e.g., list) from the dynamic collection component 104. Based upon the items contained within the dynamic collection, together with the selected rendering retrieved from the view storage component 106, the integration component 108 can apply appropriate annotations from the annotation store component 102. In other words, annotations maintained within the annotation store component 102 are a function of the items included within a dynamic collection and the instant view (e.g., $f(i,v)=a$).

In alternative embodiments, rule-based logic and artificial intelligence (AI) reasoning schemes can be employed individually or in combination in order to effect application of annotations with respect to dynamic collection items. These alternative aspects will be described in greater detail with respect to FIGS. 6 and 7 infra.

Figure 2:
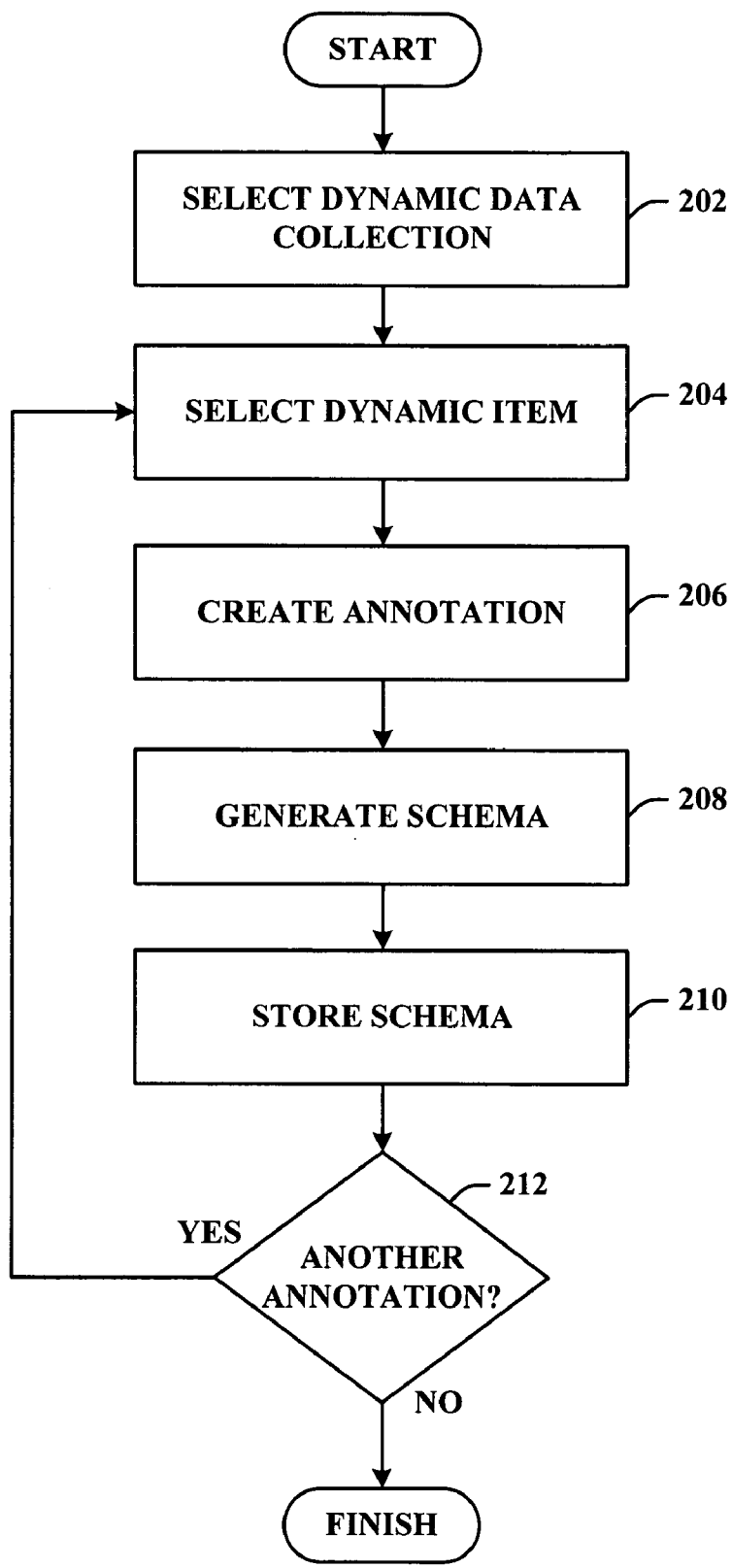
FIG. 2 illustrates an exemplary flow chart of procedures to create an annotation in accordance with a disclosed aspect.

With reference now to FIG. 2, there is illustrated a flowchart in accordance with an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Referring again to FIG. 2, at 202, a dynamic data collection is selected. As described supra, it will be appreciated that the dynamic data collection can be a list, dynamic list, query result set, directory system view or the like. Once a collection is selected, an item within the collection can be selected at 204. It is to be appreciated that the collection and item selection can be effected manually and/or automatically. For example, the system can be configured such that once a collection is selected, the system automatically cycles through each item of the collection with respect to appending an annotation. As well, it will be appreciated that a pointing or other suitable device can be employed via a graphical user interface (GUI) to specify a location for an annotation. At 206, an annotation is created. It is to be appreciated that an annotation can be any enhancement to the item specified. As well, it will be appreciated that an annotation can be applied to the collection as a whole without specifying an item therein.

Once the annotation is created at 206, a schema is generated. The schema can record a relationship between the annotation and the item with respect to a particular view. In other words, in accordance with alternate aspects, a single item can have multiple annotations, which are dependent upon a view of the collection and/or item. At 210, the schema is stored. In one example, the schema is stored in a database record or tuple. At 212, a determination is made if another annotation is to be appended in relation to the collection identified at 202. If so, the system returns to 204 whereby a target item can be selected. If another annotation is not desired, the process finishes.

Figure 3:
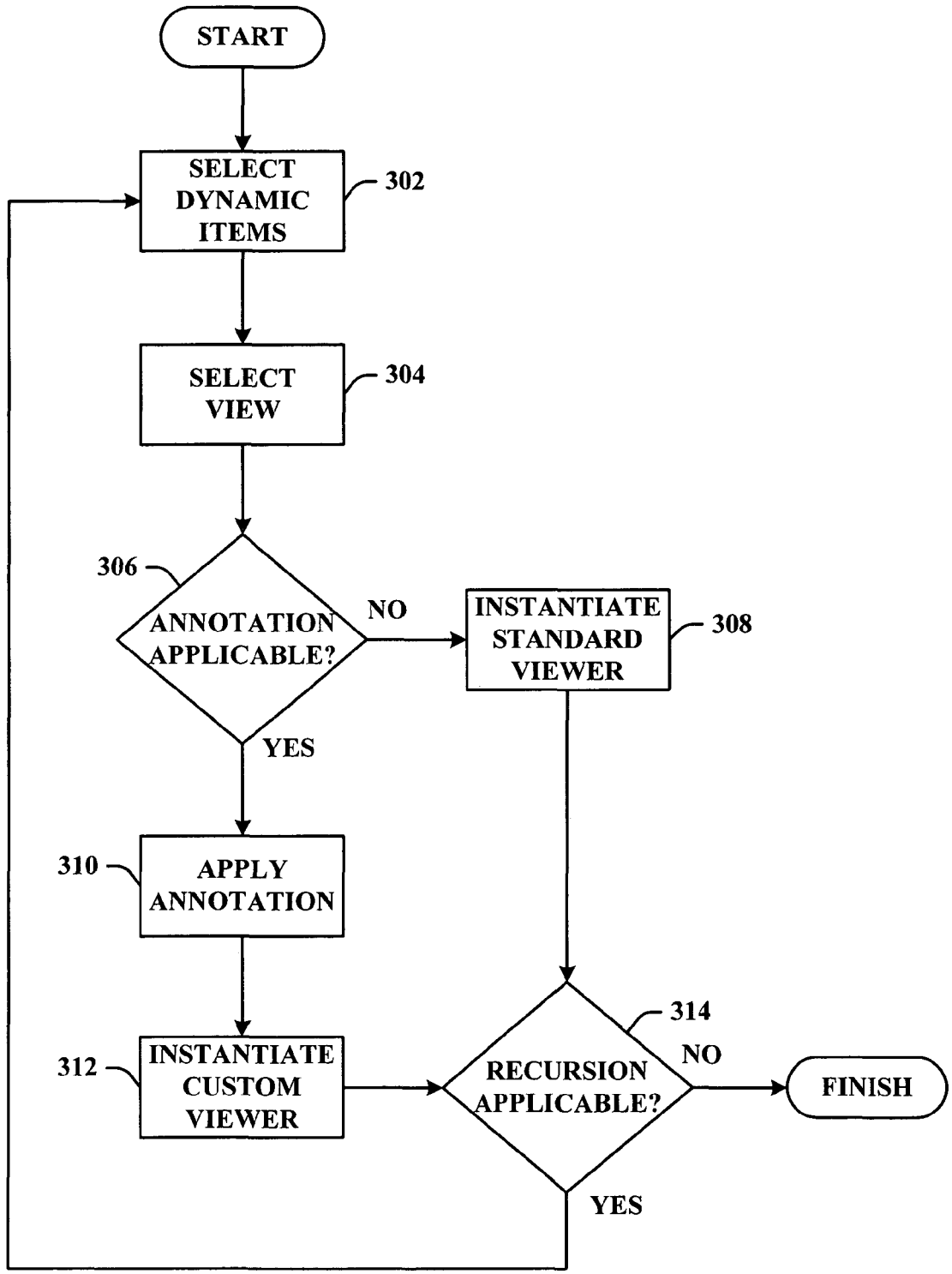
FIG. 3 illustrates an exemplary flow chart of procedures to create to render an annotation with respect to an item and view in accordance with a disclosed aspect

While FIG. 2 illustrates an exemplary aspect of creating and appending annotations to specified items, FIG. 3 illustrates another exemplary flow chart of an aspect of the invention, which addresses an application of the annotations to items. At 302, an item and/or group of items is selected. The selection of an item and/or group of items can be manual or automatic. For example, in one aspect, a user can manually select an item from a file storage system listing. In another example, a query can be employed to automatically create (e.g., select) a result set. At 304, a view is selected to display the item. Again, this selection can be manual or automatic. In other words, the selection of a view can be automatic based upon a type of the items included within the selection. For instance, suppose the selection includes associations to photo data item. In this case, a view can be automatically selected whereby thumbnail images of the associated files are grouped and rendered according to date.

At 306, the system determines if an annotation is applicable to any item contained in the collection. The determination, at 306, can be accomplished by analyzing the annotation and associated schema. The schema can include item-view tuples that facilitate identification of annotations with respect to the items and particular view. If an annotation is not applicable, the system proceeds to 308 and instantiates a standard viewer thus rendering the collection without any annotations. On the other hand, if an annotation is application to the selected items, the system proceeds to 310 and attaches the annotations in accordingly. As described supra, it is to be appreciated that the annotation(s) can be determined through the use of a schema, which defines an annotation as a function of the collection item and/or the instant view.

Once attached to the items, at 312, a customer viewer is instantiated and rendered thus displaying the annotation with respect to the item(s). At 314, the system determines if recursion is applicable. If not, the process finishes. If recursion is applicable, as illustrated, the system returns to 304 to select the recursive item.

Figure 4:
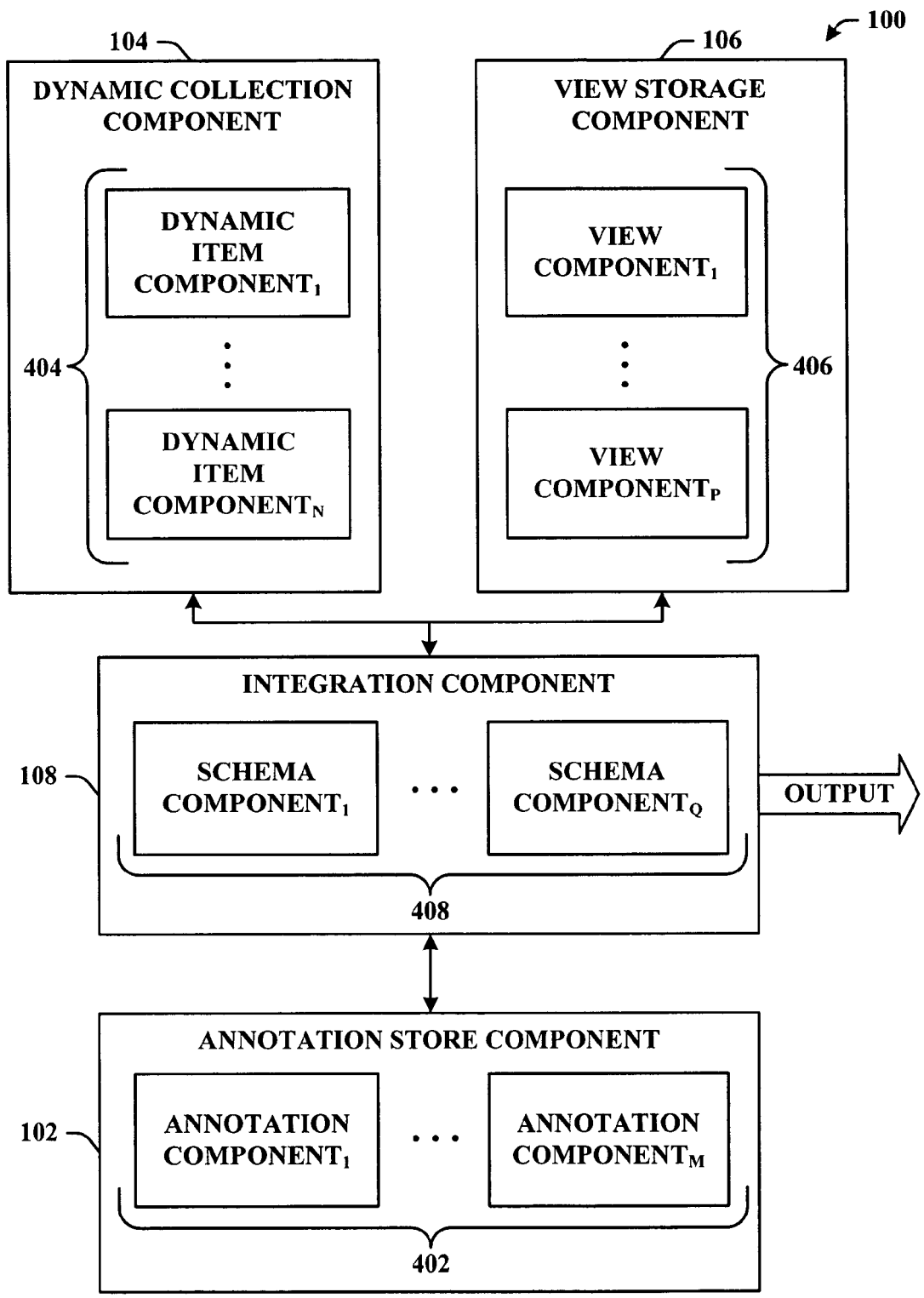
FIG. 4 is a general block diagram that illustrates an exemplary aspect that employs multiple annotations in accordance with an aspect of the subject invention.

Referring now to FIG. 4, there is illustrated a schematic representation of an alternate aspect of the subject invention. Generally, the system 400 can include an annotation store component 102, a dynamic collection component 104, a view storage component 106 and an integration component 108. It is to be appreciated that these components have the same functionality as described with reference to FIG. 1 supra.

FIG. 4 illustrates the extensibility of the subject invention as applied to multiple annotations, collections, views and/or schemas. More particularly, as illustrated in FIG. 4, the annotation store component 102 can include 1 to M annotation components, where M is an integer. Annotation components 1 to M can be referred to individually or collectively as annotation components 402. Dynamic collection component 104 can include 1 to N collection components, where N is an integer. Collection components 1 to N can be referred to collectively or individually as collection components 404. As illustrated, view storage component 106 can include 1 to P view components, where P is an integer. View collection components 1 to P can be referred to collectively or individually as view collection components 406. Finally, integration component 108 can include 1 to Q schema components, where Q is an integer. Schema components 1 to Q can be referred to individually or collectively as schema components 408.

As described supra, in operation, the integration component 108 can identify annotation component 402 or group of annotation components 402 as a function of a collection component(s) 404 and/or view component(s) 406. It will be understood that a dynamic item component 404 can have one or more annotation components 402 associated therewith. For example, a particular data item included within a dynamic item component 404 can have one annotation component 402 with respect to a first view 406 and a disparate annotation component 402 with respect to a second view component 406.

Figure 5:
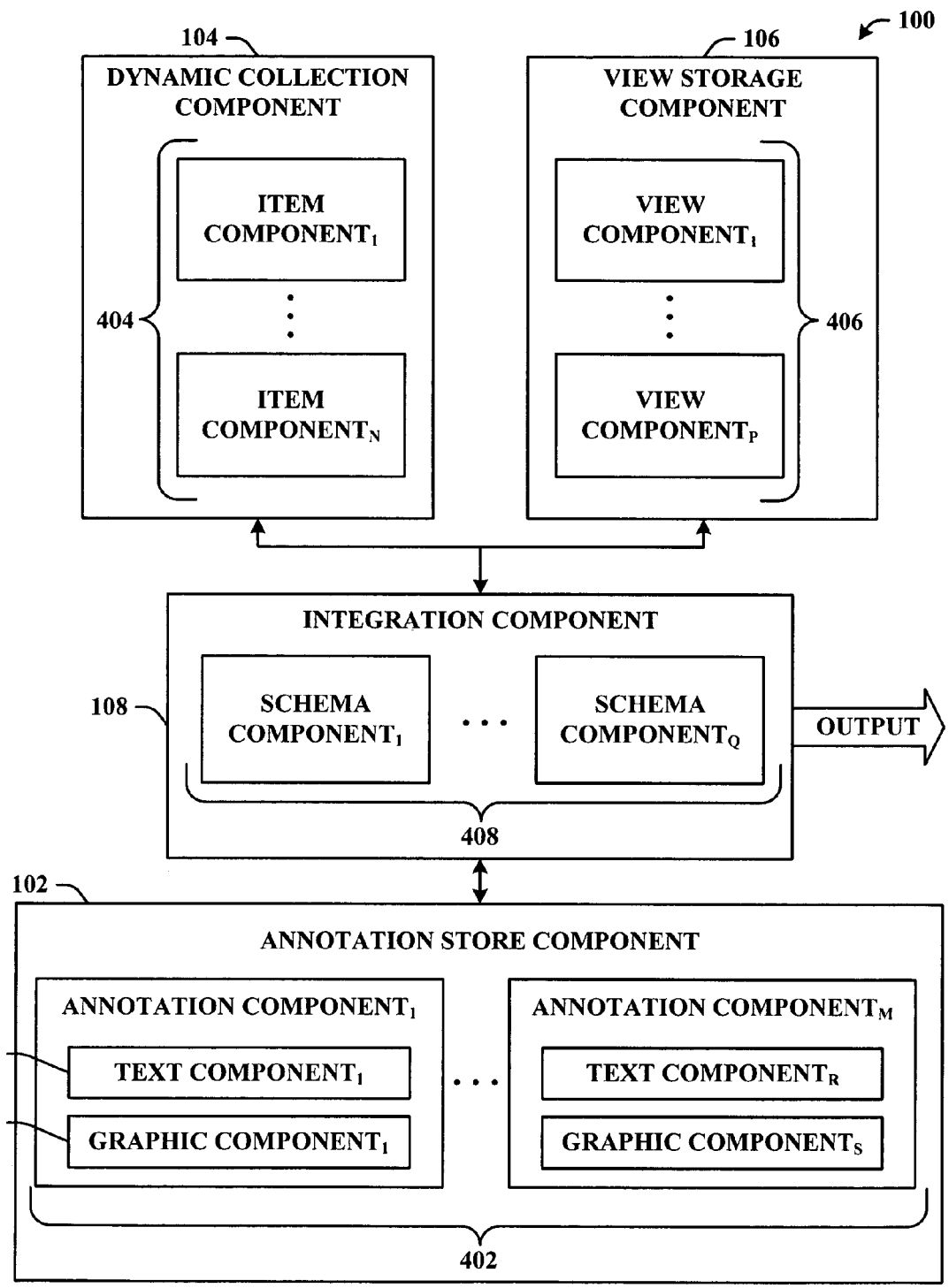
FIG. 5 is a general block diagram that illustrates exemplary annotation types in accordance with an aspect of the subject invention.

FIG. 5 illustrates that annotation components 402 can include one or more enhancement components. For example, annotation component 402 can include 1 to R textual components, where R is an integer. Textual components 1 to R can be referred to individually or collectively as textual components 502. By way of further example, annotation components 402 can include 1 to S graphical components, where S is an integer. Graphical components 1 to S can be referred to individually or collectively as graphical components 504. Although the exemplary system of FIG. 5 textual components 502 and graphical components 504, it is to be appreciated that annotation components 402 can include any type of enhancement to describe a collection and/or item within a collection. By way of further example, the annotation component 402 can include, but is not limited to include, an audible and/or spatial relationship to further enhance a collection and/or item.

The following scenario is provided to add context to the subject invention and to exemplify extensibility of the invention. Suppose a real estate agent captures multiple photographs of a property in order to prepare a sales brochure for advertisement. The real estate agent can then post the photographs on a public and/or shared store (e.g., internet). In accordance with the subject invention, the real estate agent can create multiple annotation components 402 which are a function of the item (e.g., photograph) and a particular view 406 of the item.

Assuming there is a photograph of the property captured in the winter season, this photograph may not illustrate the foliage as would appear in the spring/summer season. In accordance thereto, the real estate agent will be able to create multiple annotation components 402 and in particular, multiple textual components 502 relating to the same photograph. One textual component 502 can be applied to a "Buyer's" view whereby buyers would see a textual comment 502 on the photo denoting "Winter Photo—BEAUTIFUL FOLIAGE in Spring/Summer." Similarly, the real estate agent could prepare a textual component 502 that is applied to a "Seller's" view whereby the seller would see a note from the real estate agent such as "This photo should be replaced with a Spring/Summer photo."

As described supra, in operation, the integration component 108 can employ the schema components 408 to determine which, if any, annotations should be rendered as output (e.g., displayed) based upon the collection component(s) 404 (or items therein) and the view component(s) 406.

Figure 6:
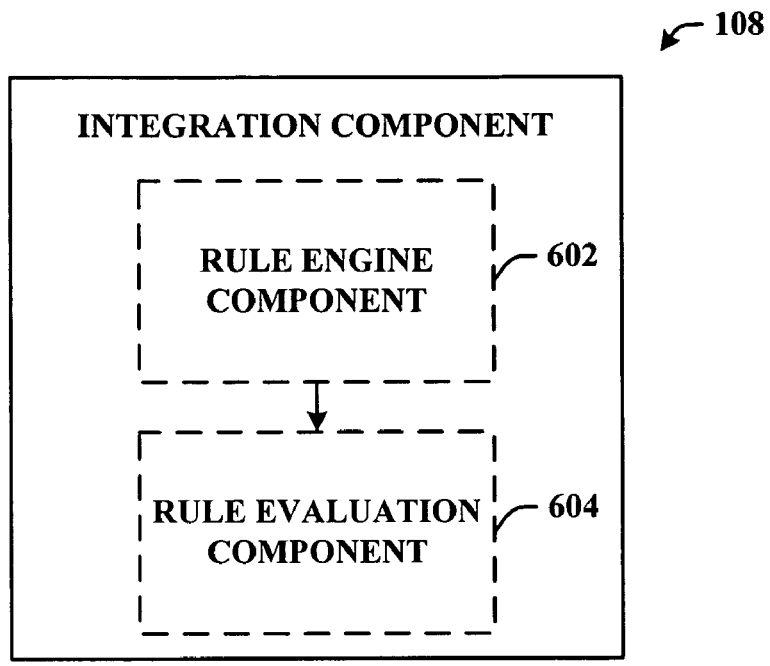
FIG. 6 illustrates an integration component including rule-based mechanisms in accordance with an aspect of the invention.

With reference now to FIG. 6, an alternate aspect of the integration component 108 (FIG. 1) is shown. More particularly, integration component 108 generally includes a rule engine component 602 and a rule evaluation component 604. In accordance with this alternate aspect, an implementation scheme (e.g., rule) can be applied to create and/or attach an annotation to a dynamic data item. By way of example, the rule-based implementation can automatically annotate data items included within the results of a query by employing a predefined and/or programmed rule(s) based upon any desired criteria (e.g., file type, file size, hardware characteristics).

In the exemplary aspect of FIG. 6, the rule engine component 602 can be programmed or configured in accordance with any user-defined preference. For instance, a user can establish a rule that can implement a query of a preferred type of file (e.g., music). In this exemplary aspect, the rule can be constructed to annotate all music files of a particular genre. Accordingly, annotations can be displayed in accordance with a specified view. It will be appreciated that any of the specifications utilized in accordance with the subject invention can be programmed into a rule-based implementation scheme. The rule evaluation component 604 facilitates application of the rule. Based upon the output of the rule evaluation component 604, the integration component 108 can annotate items thus effecting comprehensive visualization of dynamic data items.

Figure 7:
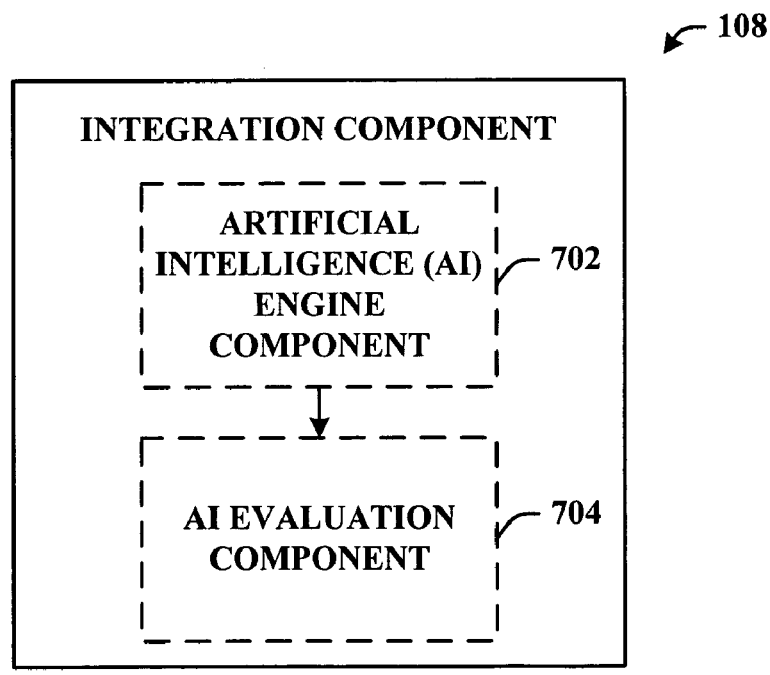
FIG. 7 illustrates an integration component including artificial intelligence-based mechanisms in accordance with an aspect of the invention.

A schematic diagram of another alternative aspect of the integration component 108 is illustrated in FIG. 7. In addition to or in place of the rule-based components described with reference to FIG. 7, the integration component 108 can include an artificial intelligence (AI) engine component 702 and an AI evaluation component 704.

In accordance with this aspect, the optional AI engine and evaluation components 702, 704 can facilitate automatically effecting various aspects of the integration component 108. The AI components 702, 704 can optionally include an inference component (not shown) that can further enhance automated aspects of the AI components utilizing, in part, inference based schemes to facilitate inferring intended actions to be performed at a given time and state. The AI-based aspects of the invention can be effected via any suitable machine-learning based technique and/or statistical-based techniques and/or probabilistic-based techniques.

In the alternate aspect, as further illustrated by FIG. 7, the subject integration component 108 (e.g., in connection with creating and applying annotations) can optionally employ various artificial intelligence based schemes for automatically carrying out various aspects thereof. Specifically, an artificial intelligence engine and evaluation components 702, 704 can optionally be provided to implement aspects of the subject invention based upon artificial intelligence processes (e.g., confidence, inference). For example, a process for creating and applying annotations based upon the content type of data items included in a dynamic collection with respect to a specified view can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed (e.g., annotation). In the case of annotation, for example, attributes can be file types or other data-specific attributes derived from the file types and/or contents, and the classes can be categories or areas of interest.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative aspects whereby based upon a learned or predicted user intention, the system can prompt for authorization to attach an annotation. Likewise, an optional AI component could prompt a user to delete an annotation from an item.

Figure 8:
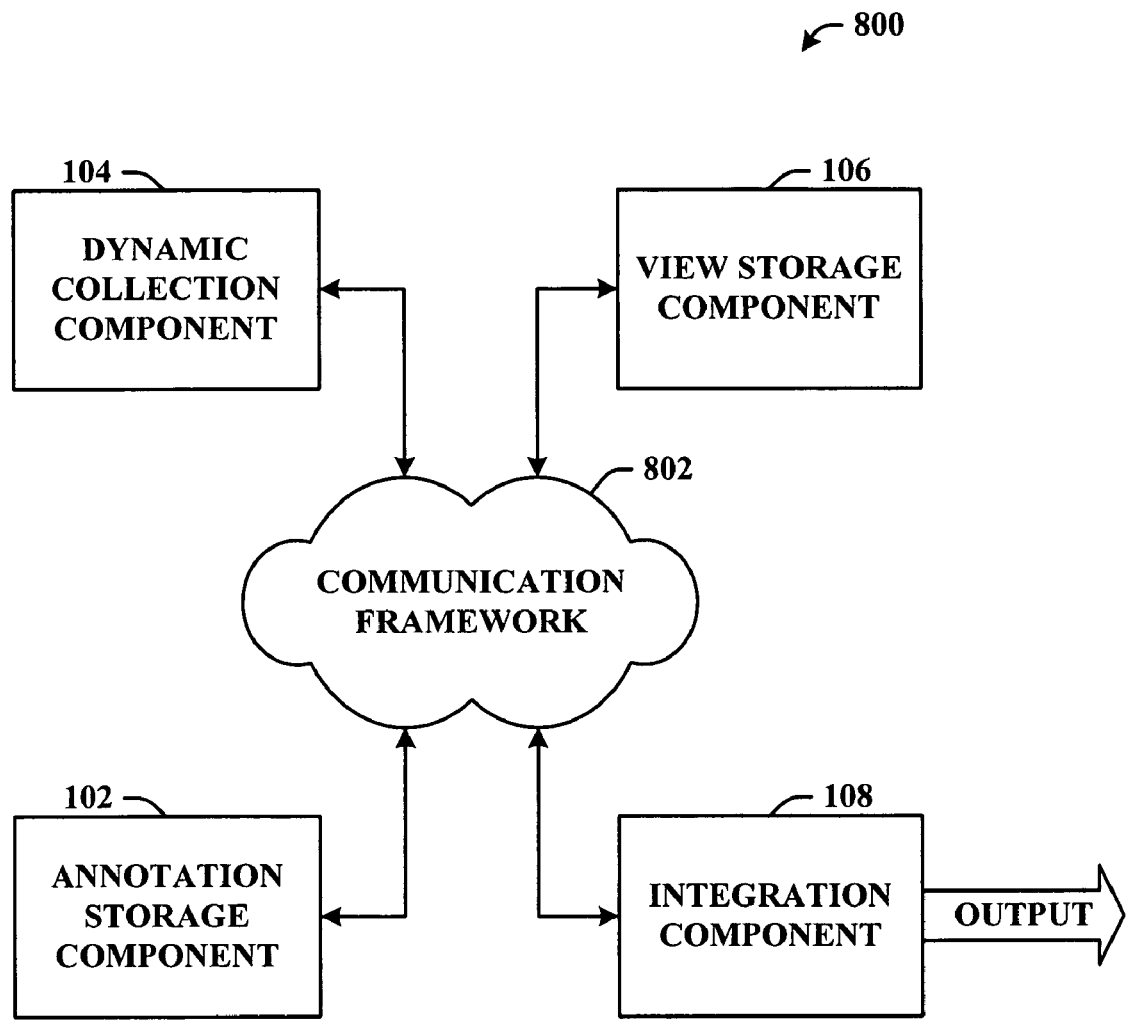
FIG. 8 illustrates a component diagram of an exemplary computing environment in accordance with an aspect of the subject invention.

Referring to FIG. 8, a schematic block diagram of an exemplary computing environment is shown in accordance with an aspect of the subject invention. Specifically, the system 800 illustrated includes an annotation storage component 102, a dynamic collection component 104, a view storage component 106 and an integration component 108. These components can have the same functionality as discussed in detail supra with reference to FIG. 1. Additionally, the system 800 illustrated employs a communication framework 802 whereby annotation storage component 102, dynamic collection component 104, view storage component 106 and integration component 108 can be located remote from one another.

By way of example, the integration component 108 can be located at a remote location from the annotated items. Accordingly, the subject invention can be employed to annotated items via communication framework 802. Communications framework 802 can employ any communications technique (wired and/or wireless) known in the art. For example, communications framework 802 can include, but is not limited to, Bluetooth™, Infrared (IR), Wi-Fi, Ethernet, or the like.

Figure 9:
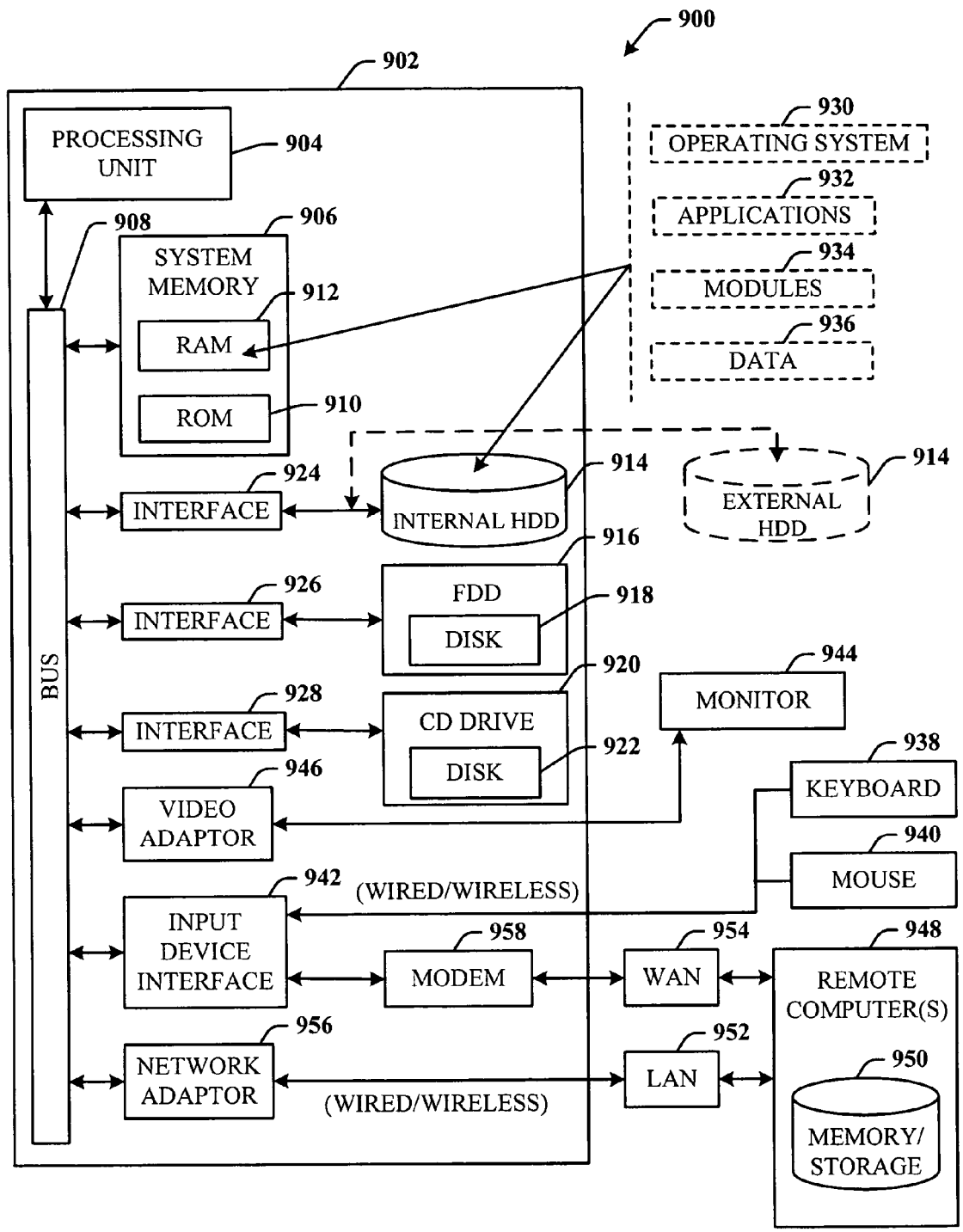
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the subject invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be-a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
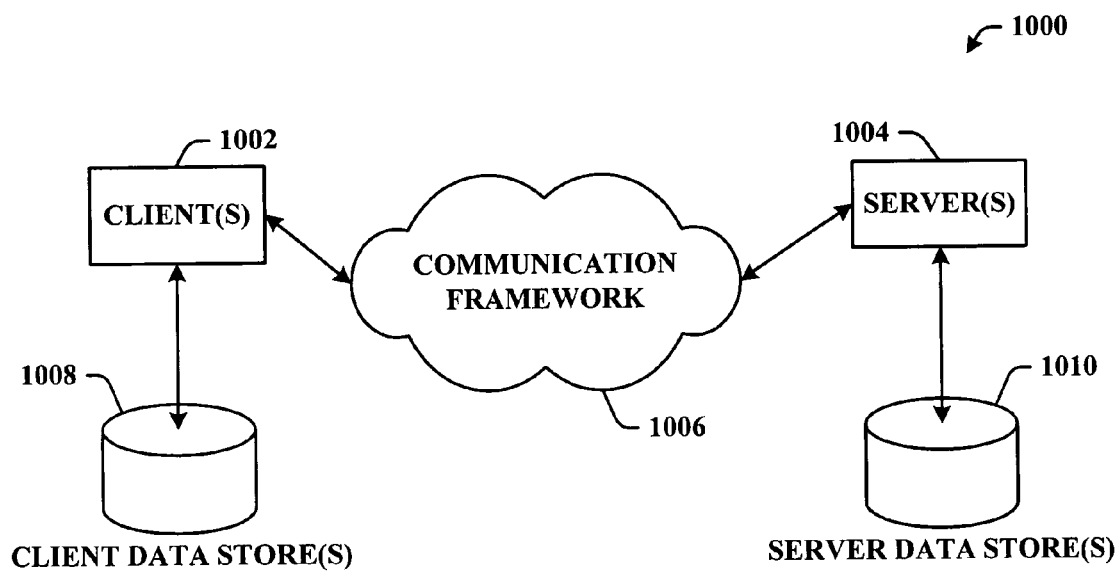
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the subject invention, for example. The system 1000 also includes one or more server(s) 1004. The server(s) 1004 can also be hardware and/or software (e.g., threads, processes, computing devices). The servers 1004 can house threads to perform transformations by employing the subject invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system that facilitates enhancing data in a computer readable storage medium, the computer system comprising at least a processor and memory and also comprising:
   a dynamic collection component stored in the memory and executed by the processor that concurrently stores and maintains a plurality of dynamic collections of files comprising respective able user-defined queries of a file system that is maintained by the computer system, where the dynamic collections are dynamically and automatically maintained by the dynamic collection component by background monitoring of changes to the file system and automatically and dynamically adding and removing files to the dynamic collections of files according to the monitoring determining whether the files satisfy the respective queries, wherein when the dynamic collections are displayed a user interacts with the dynamic collections to generate first annotations comprising annotations of the files in respective dynamic collections therein and second annotations of respective dynamic collections but not of particular files;
   an annotation storage component in the memory that, by execution of the processor, stores the user-generated annotations, the annotations having been interactively generated by a user interacting with the displayed dynamic collections;
   an integration component that, as executed by the processor, stores first association information that associates each of the stored first annotations with a particular file and a particular dynamic collection containing the file such that a file can have multiple first annotations that are each associated with the particular file and with different respective dynamic collections, stores second association information that associates each of the stored second annotations with a particular dynamic collection but not with a particular file, wherein when a dynamic collection is displayed the first and second associations are searched to find any first and second annotations associated with the displayed dynamic collection, and any first annotations associated with a particular file in the displayed dynamic collection are displayed with respect to the corresponding file and any annotations associated with the displayed dynamic collection but not with a particular file are displayed during display of the dynamic collection.

2. The system of claim 1, wherein the dynamic collection comprises a dynamic list of files.

3. The system of claim 1, wherein the annotations include at least one of a graphical annotation or a textual annotation.

4. The system of claim 1, further comprising a schema component that stores the association information in the form of schema to facilitate attaching disparate annotations to the files based at least in part on the corresponding dynamic collection.

5. The system of claim 1, wherein the annotations include at least one of a textual comment, an audible comment, a visual effect applied to a of the corresponding dynamic collection, or a position identifier.

6. The system of claim 1, wherein the integration component includes a retrieval component that employs a query used by the dynamic collection component to generate the dynamic collection.

7. The system of claim 1, wherein the integration component comprises:
   a rule engine component that automatically instantiates a rule that implements a predefined criteria; and
   a rule evaluation component that applies the rule to associate the annotations to the files.

8. The system of claim 1, wherein an artificial intelligence component predicts a user intention for an annotation as a function of historical user criteria.

9. The system of claim 8, wherein the artificial intelligence component includes an inference component that facilitates automatic association of at least one annotation to at least one file as a function of the predicted user intention.

10. The system of claim 1, wherein the association information includes mapping identifiers for respective annotations.

11. The system of claim 1, the file comprises a folder of a file system of the computer system.

12. The system of claim 1, wherein further comprising a graphical user interface for interactively generating the annotations and for displaying files of a dynamic collection along with any associated annotations.

13. A computer implemented method for enhancing data in a computer readable storage medium, the method comprising:
   generating and concurrently storing dynamic collections of files that are dynamically and automatically maintained by and on the computer by a local file system of the computer, the file system handling changes to files in the file system, wherein a dynamic collection is maintained by the computer storing information, entered by a user, defining the dynamic collection where the information comprises membership criteria used by the computer to dynamically and automatically determine which files on the computer belong to the dynamic collection such that file membership in a dynamic collection changes automatically and dynamically such that files are added and removed from the dynamic collection when they are modified/created and are determined, according to background monitoring of the file system, to begin to satisfy or not satisfy the membership criteria and when a dynamic collection is displayed including files thereof, receiving user input creating first and second annotations of the displayed dynamic collection, wherein the first annotations are associated with the dynamic collection and respective files of the dynamic collection and the second annotations are associated with the dynamic collection itself and not any particular files in the dynamic collection;

storing associations of the first annotations to both the respective annotated files and the corresponding dynamic collection such that each first annotation is associated with both a file and a dynamic collection, where a same file has a plurality of associated first annotations that are associated with different dynamic collections such that the file is annotated with one of the first annotations when displayed with a first dynamic collection and the file is annotated with another first annotation when displayed with a second dynamic collection, where the association of an annotation to a file is determined as a function of the currently displayed dynamic collection and a file therein.

14. The method of claim 13, further comprising generating a dynamic collection based at least in part on a file system directory view.

15. The method of claim 13, further comprising creating an annotation that corresponds to a sub-item of the dynamic collection and applying an annotation schema upon rendering the sub-item.

16. The method of claim 13, further comprising recursively applying additional annotations to sub-items of a dynamic collection.

17. A method of annotating files stored by a local file storage system of a computing device, the method comprising:

storing files in the local file storage system in which a user can store and access and modify arbitrary files maintained by the computing device;

storing arbitrary dynamic collections of the files, a dynamic collection having been interactively defined by a user specifying criteria that must be satisfied for a file to belong to the dynamic collection, where files are automatically and dynamically added to and removed from the dynamic collection in accordance with changes to the files that cause them to satisfy and not satisfy the criteria, the changes detected by background monitoring of the local file storage system;

displaying the dynamic collections by displaying indicia of files in the dynamic collections, and while so displaying receiving user input defining first annotations of the files corresponding to the indicia and second annotations of the dynamic collections themselves and not individual files, and storing the first and second annotations and association information that associates each first annotation with both a particular one of the files and a particular one of the dynamic collections and that associates each second annotation with a particular dynamic collection but not a file therein, wherein some files have multiple first annotations associated therewith and associated with different respective dynamic collections;

further displaying the annotated dynamic collections by automatically selecting, using the association information, for a given annotated dynamic collection, those of the first and second annotations that are associated with the given annotated dynamic collection, wherein a first annotation is displayed in association with a particular file displayed with the given dynamic collection and a second annotation is displayed in association with given dynamic collection but not in association with a particular file in the given dynamic collection.

* * * * *